United States Patent [19]

Iwasaki et al.

[11] Patent Number: 5,427,411
[45] Date of Patent: Jun. 27, 1995

[54] SUPPORT STRUCTURE FOR SUPPORTING STEERING APPARATUS OF VEHICLE

[75] Inventors: Yosuke Iwasaki; Toshiteru Yoshimura; Masashi Ohtsuka, all of Hiroshima; Kiyoshi Hayashi, Hatsukaichi; Keisuke Miyoshi; Toshiaki Ogawa, both of Hiroshima, all of Japan

[73] Assignee: Mazda Motor Corporation, Hiroshima, Japan

[21] Appl. No.: 255,769

[22] Filed: Jun. 7, 1994

[30] Foreign Application Priority Data

Jun. 7, 1993 [JP] Japan .................................. 5-135737
Dec. 15, 1993 [JP] Japan .................................. 5-315059

[51] Int. Cl.6 .............................................. B62D 1/18
[52] U.S. Cl. ........................................ 280/777; 74/492
[58] Field of Search .................... 280/777, 775; 74/492

[56] References Cited

FOREIGN PATENT DOCUMENTS 3-56455 4/1986 Japan .
327899 4/1986 Japan .
3-567 1/1991 Japan .

Primary Examiner—Kenneth R. Rice
Attorney, Agent, or Firm—Keck, Mahin & Cate

[57] ABSTRACT

A steering apparatus support structure includes a steering support member extending transversely in a vehicle body and secured to rigid side components of the vehicle body which are likely free from deformation during a frontal end collision and a support bracket device secured to and supported by the steering support member for supporting forward and rearward portions of the steering column. The support bracket device is releasably linked to a vehicle body part which can be deformed backward during a frontal end collision, and the vehicle body part is allowed to be disconnected from the support bracket device when backward deformation is caused in the vehicle body part.

22 Claims, 11 Drawing Sheets

SUPPORT STRUCTURE FOR SUPPORTING STEERING APPARATUS OF VEHICLE

BACKGROUND OF THE INVENTION

1. Field of the Invention

The present invention relates to a support structure for a steering apparatus of an automotive vehicle.

2. Description of Related Art

Typically, automotive vehicle steering apparatus or systems of, for instance, the rack-and-pinion type have a steering gear box for converting rotary motion produced by a steering wheel into linear motion and transmitting it to wheels via tie rods so as to turn the wheels. The transmission of rotary motion of the steering wheel is connected to the gear box by means of a steering shaft and, if necessary, a relay rod or intermediate shaft. This steering shaft is typically held for rotation by and within a hollow steering column supported by parts of the vehicle body so as to orient appropriately the steering wheel toward the driver. Specifically, the steering column is supported at its lower or forward end portion directly or indirectly by a stationary part of the vehicle body, such as a dash panel, which is relatively weak in structural rigidity, and at its middle portion directly by a support member comprising, for instance, a hollow steel pipe extending transversely between and secured to side members, such as front pillars, of the vehicle body which have high rigidity. This kind of steering apparatus support structure includes a mechanism for allowing the steering column to be displaced downward as the forward portion of the steering column is forced backward during a frontal end collision so as to prevent the steering wheel from being displaced upward and backward toward the driver. Such a steering apparatus support structure is known from, for instance, Japanese Unexamined Patent Publication No. 3-567.

The steering apparatus support structure described in the publication mentioned above is insufficient in structural rigidity against oscillating external impacts which produce up and down positional changes of where the steering wheel is installed.

Another type of steering system support structure includes a connecting member which connects a steering column with a rigid, stationary support member or structure, such as a hollow steel pipe, disposed immediately after a dashboard by which an engine compartment and a passenger compartment are separated and which supports an instrument panel. This rigid support member is hereafter referred to as an instrument panel support member or structure for simplicity.

With apparatus support structure of this kind, in the event of first or primary frontal end collisions, various devices, such as an engine and a powertrain, placed inside the engine compartment are forced backward and, sometimes, push the dashboard and instrument panel. Such backward positional displacement of the dashboard and instrument panel forces the steering column with the steering wheel, which is secured to the instrument panel support member, backward. Such a primary frontal end collision is often accompanied by what is called a secondary collision in which the driver is thrown forward due to an impact and hits instruments in front of the driver immediately after the occurrence of a frontal end collision. If the steering wheel has been forced backward upon the primary frontal end collision, the driver hits strongly the steering wheel during the secondary collision, resulting in serious bodily injury or damage.

In order to avoid such a secondary collision, a collapsible type of steering shaft apparatus is described in, for instance, Japanese Utility Model Publications Nos. 3-27899 and 3-56455, and some of them have been put into the market. Such a collapsible steering shaft support structure includes mechanical connecting or linking members: namely a first connecting or linking member for mechanically connecting a support bracket secured to a deformation free component of the vehicle body (the term "deformation free component" used herein shall mean and refer to a component or part of the vehicle body very hard to be deformed by an external impact due to frontal end collisions) and an instrument panel support member together, and a second connecting or linking member for mechanically connecting the steering column and the support bracket together. The first connecting member is designed and adapted to allow the support bracket to be disconnected easily from the instrument panel support member when a relative backward movement occurs between the support bracket and instrument panel support member. Similarly, the second connecting member is designed and adapted to allow the steering column to be disconnected easily from the support bracket when a relative forward movement occurs between the steering column and support bracket.

With the typical steering apparatus equipped with such a collapsible structure, when the instrument panel support member is forced backward due to a primary frontal end collision, the mechanical connection is broken between the instrument panel support member and support bracket, preventing the steering shaft, and hence the steering wheel, from being forced backward. In addition, if the driver is thrown forward and hits the steering wheel during a secondary collision, the steering column is forced forward by the driver and disconnected from the support bracket and, as a result, allowed to be further displaced forward by the driver. This forward displacement of the steering column enhances absorption of the energy of an impact before it has a considerable effect on the driver.

However, with the steering apparatus support structure of this kind, when an external impact is exerted somewhat obliquely upward on the instrument panel support member through the dashboard upon the occurrence of an frontal end collision, it is hardly effective for the first connecting member to disconnect the mechanical linkage of the support bracket from the instrument panel support member. In this event, the supporting bracket is forced backward being accompanied with the instrument panel support member, and is accordingly displaced backward relatively to the steering column. Viewing this movement from the side of the steering column, the steering column is displaced forward relatively to the support bracket. As a result, the second connecting member possibly breaks the mechanical linkage of the steering column with the support bracket during a primary frontal end collision. If in fact the mechanical linkage by the first connecting member is broken during a primary frontal end collision, the steering column and/or the steering wheel is hardly held steady in position, leading to ineffective operation of an air bag as a supplemental restraint system to the driver. Further, in the event of a frontal end collision, if a considerably strong external impact is exerted on the foremost part of the steering apparatus, such as the gear box, the steering shaft is forced backward, possibly making the steering wheel interfere with the driver.

In addition, it is of overriding importance today that these steering systems can be assembled in vehicles with high working efficiency. For the purpose of providing a brief background that will enhance an understanding of the troublesome installation of conventional steering systems in vehicles, reference is made to FIGS. 1 to 3.

Referring to FIG. 1, in order to provide steady support of a steering shaft assembly 51, including a steering column, a steering shaft rotatively received in the steering column and a steering wheel, the assembly 51 is fixedly attached at its lower or forward and upper or rearward portions to a bracket 52 which is assembled to the vehicle body by, on one hand, mounting the bracket 52 on a rigid support beam 53 extending transversely between rigid side members of the vehicle body, such as front pillars (not shown), and, on the other hand, bolting, or otherwise securing, the front half portion of the bracket 52 to a cowl panel 54 which is one of stationary rigid components of the vehicle body. When the steering shaft assembly 51 with the bracket 52 attached previously thereto is placed in position into the vehicle body, it is hard to place the steering shaft assembly 51 in the vehicle body without any interference of the bracket 52 with structural components of the vehicle body. Specifically, before assembling of the steering shaft assembly 51 into the vehicle body, the bracket 52 is mounted on the rigid support beam 53 first and then the steering shaft assembly 51 is secured to the bracket 52.

After having preparatorily assembled an instrument panel 55 to the steering shaft assembly 51 thus pre-assembled to the bracket 52 and support beam 53 as one whole as shown in FIG. 2, the whole assembly is placed inside the vehicle body. During placing the whole assembly, a pair of stay arms 56 extending downward from the support beam 53 are linked to a pair of counter stay arms 58 extending upward from a floor panel (not shown) by means of the engagement between a link pin 57 and a slot-like opening 59 provided on each pair of the stay arms 56 and 58. After the completion of this provisional installation, the whole semi-assembled steering shaft assembly 51 including the support beam 53 is turned upward about the link pins 57 and changed in location from a preparatory position indicated by a solid line to a fitting position indicated by a dotted line in FIG. 2. During changing of the semi-assembled steering shaft assembly 51 in location, the movement of the bracket 52 along a line indicated by a reference character α makes the bracket 52 interfere at its forward end with the cowl panel 54, so as to cause a decline in the efficiency of installation of the steering shaft assembly 51.

SUMMARY OF THE INVENTION

It is an object of the present invention to provide a steering shaft support structure which can hold a steering shaft, and hence a steering wheel, in proper position and prevent backward movement of the steering shaft even when a steering shaft support bracket fails to disengage from a deformation free component of the vehicle body during a frontal end collision.

It is another object of the present invention to provide a steering shaft support structure which can support a steering shaft in position and prevent supporting of the steering shaft from being damaged during a frontal end collision.

It is still another object of the present invention to provide a steering shaft support structure which allows installation of a steering shaft assembly to be accomplished without any interference with parts of the vehicle body and with high working efficiency.

The above objects of the present invention are achieved by providing a support structure for supporting a collapsible steering apparatus or assembly of a vehicle including a steering shaft with a steering wheel and a hollow steering column in which the steering shaft is rotatively received. The collapsible steering apparatus support structure includes a steering support member extending transversely in a vehicle body and secured at its opposite ends to stationary side components which are likely free from deformation during frontal end collisions of the vehicle and a support bracket member-secured to and supported by the steering support member. The support bracket member is releasably linked by a first link device to a vehicle body part or vehicle body component, for instance a support member for supporting an instrument panel, which can be deformed backward during a frontal end collision and allows the vehicle body part to be disconnected from the support bracket member during backward deformation of the vehicle body part. Further, a forward portion of the steering column is secured by a second link device to the support bracket, and a rearward portion of the steering column is releasably linked with the support bracket. This second link device allows the steering column to be disconnected from the support bracket and collapses when the steering wheel suffers an impact in a lengthwise direction from the back to the front.

Specifically, the first link device includes a disengageable inter-connecting mechanism, disposed between the instrument panel support member and the support bracket member, which disengages the instrument panel support member from the support bracket member during relative positional displacement between the instrument panel support member and the support bracket member.

If the steering apparatus is not of a collapsible type, the steering apparatus support structure may include a link device for releasably linking the support bracket device to a part of the vehicle body which can be deformed backward during a frontal end collision and allowing the vehicle body part to be disconnected from the support bracket device during backward deformation of the vehicle body part. The link device includes a disengageable interconnecting mechanism, disposed between the instrument panel support member and support bracket device, and is capable of disengaging the instrument panel support member from the support bracket device during relative positional displacement between the instrument panel support member and support bracket member.

In the case that the support bracket device to be secured to and supported by the steering support member includes front and rear support assemblies for supporting forward and rearward portions of said steering column, respectively, and a link device, releasably links the support bracket device to the vehicle body part which can be deformed backward during a frontal end collision and allows the vehicle body part to be disconnected from the support bracket device during backward deformation of the vehicle body part, the assembling of the steering apparatus into the vehicle body is carried out by, first of all, provisionally securing the front support assembly to the forward portion of the steering column and attaching the rear support assembly to the steering support member. Thereafter, the link device is secured to the vehicle body part. Following introducing of the steering apparatus into the vehicle body, the front support assembly is secured to the link device and the steering support member is subsequently secured to the stationary side components of the vehicle body. Finally, after having inter-connected the front support assembly and the rear support assembly together, the rearward portion of the steering column is secured to the rear support assembly.

Further, steering support member stay arms and floor stay arms are provisionally attached to opposite ends of said steering support member and opposite sides of a floor portion of the vehicle body, respectively. These stay arms are pivotally engaged before the securing of the steering support member to the stationary side components of the vehicle body and make it easy to turn the steering apparatus upward so as to place the steering support member between the stationary side components.

With the steering apparatus support structure according to the present invention, the steering column is supported at its forward and rearward portions by the front and rear support bracket assemblies of the support bracket device supported by the steering support member rigidly supported at its opposite ends by the stationary side components, such as front pillars, which are likely free from deformation during a frontal end collision and linked at the forward and rearward portions to the vehicle body part or component, such as the instrument panel support member, which can be deformed backward during a frontal end collision and the steering support member, respectively. This support structure prevents effectively the steering column from being displaced in position due to a strong impact exerted on the steering apparatus resulting from a frontal end collision. By means of the linkage of the forward portion of the steering column with the vehicle body part or component being able to deform, the steering shaft assembly suffers less vibrations during ordinary traveling. In addition, by means of the releasable linkage of the forward portion of the steering column, the steering column is disconnected at the forward portion from the vehicle body part if the vehicle body part is deformed and causes relative displacement with respect to the steering column. Accordingly, the steering column is free from displacement in position.

The assembling of the steering apparatus support structure into the vehicle body is made quite easily and efficiently, and enables assembly of the steering apparatus support structure into the vehicle body without any interference of the support bracket device with the vehicle body that, after the steering column has been linked or connected to the vehicle body part, the steering support member with the rear support assembly is placed in position before being secured to the rearward portion of the steering column.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used denote similar or the same elements or parts throughout the drawings, and in which.

DETAILED DESCRIPTION OF THE PREFERRED EMBODIMENTS

Figure 4:
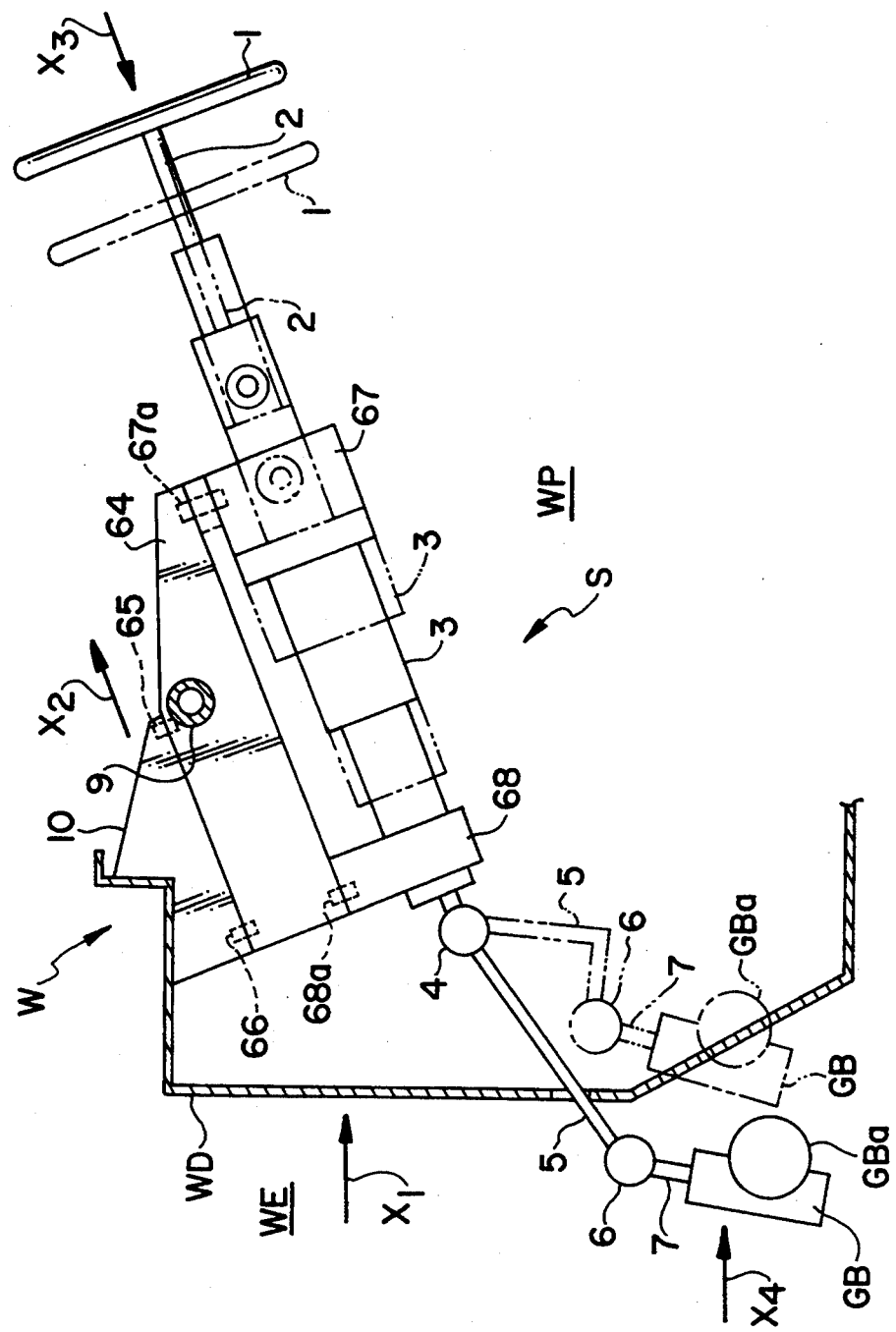
FIG. 4 is a schematic side view, partially in cross-section, of a steering shaft support structure in accordance with a preferred embodiment of the present invention.

Referring now to the drawings in detail, and in particular, to FIG. 4 showing a steering apparatus support structure according to a preferred embodiment of the present invention, a collapsible steering apparatus S is installed in the front section W of a vehicle body. The steering apparatus S includes a steering shaft 2 with a steering wheel 1 coaxially attached thereto. A hollow steering column 3 coaxially receives and rotatively holds the steering shaft 2 therein. Collapse of the steering system S takes place on the steering shaft 2 and steering column 3. Specifically, the steering column 3 comprises an upper outer column portion 3a and a lower inner column portion 3b (see FIG. 5) partly inserted into the upper outer column portion 3a. These upper outer and lower inner column portions 3a and 3b are fixed with, for instance, resin adhesive agents or the like at the overlapped portion 3c so as to be separated and axially collapsed along the overlapped portion 3c when subjected to a strong axial impact. Similarly, the steering shaft 2 is composed by two parts connected so as to axially collapse following the collapse of the steering column 3. Various collapsible mechanisms are well known in the art, and any known type of collapsible mechanism may be incorporated in the steering apparatus S.

Turn of the steering shaft 2, which is made by the driver through the steering wheel 1, is transmitted to a first relay rod or shaft 5 joined to the steering shaft 2 through a first universal joint 4, a second relay shaft or pinion shaft 7 joined to the first relay shaft 5 through a second universal joint 6, and a steering gear box GB. The steering gear box GB, which multiplies driver turning force and converts rotative motion into linear motion, may be of any type well known to those skilled in the art. This steering gear box GB causes linear movement of a tie rod GBa connected to each of wheels by means of a steering knuckle assembly or unit (not shown). The wheels turn when the steering wheel 1 is turned and causes the steering knuckle assemblies or units to swivel through the steering apparatus S.

This steering apparatus S is preparatorily assembled and fitted as one unit to the front section of the vehicle body by means of a support structure.

Figure 5:
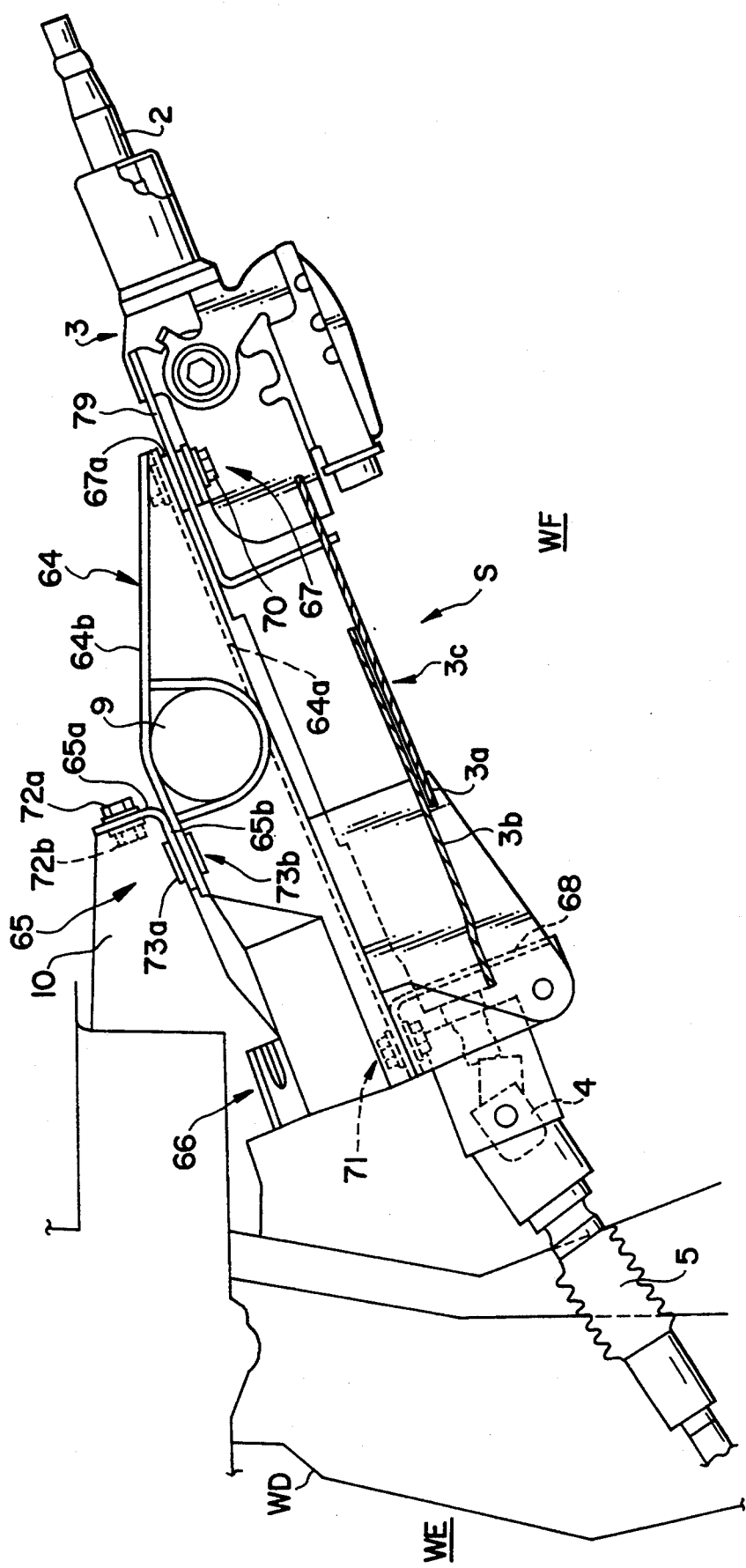
FIG. 5 is a side view, partially in section, of an essential part of the steering shaft support structure of FIG. 4.
Figure 6:
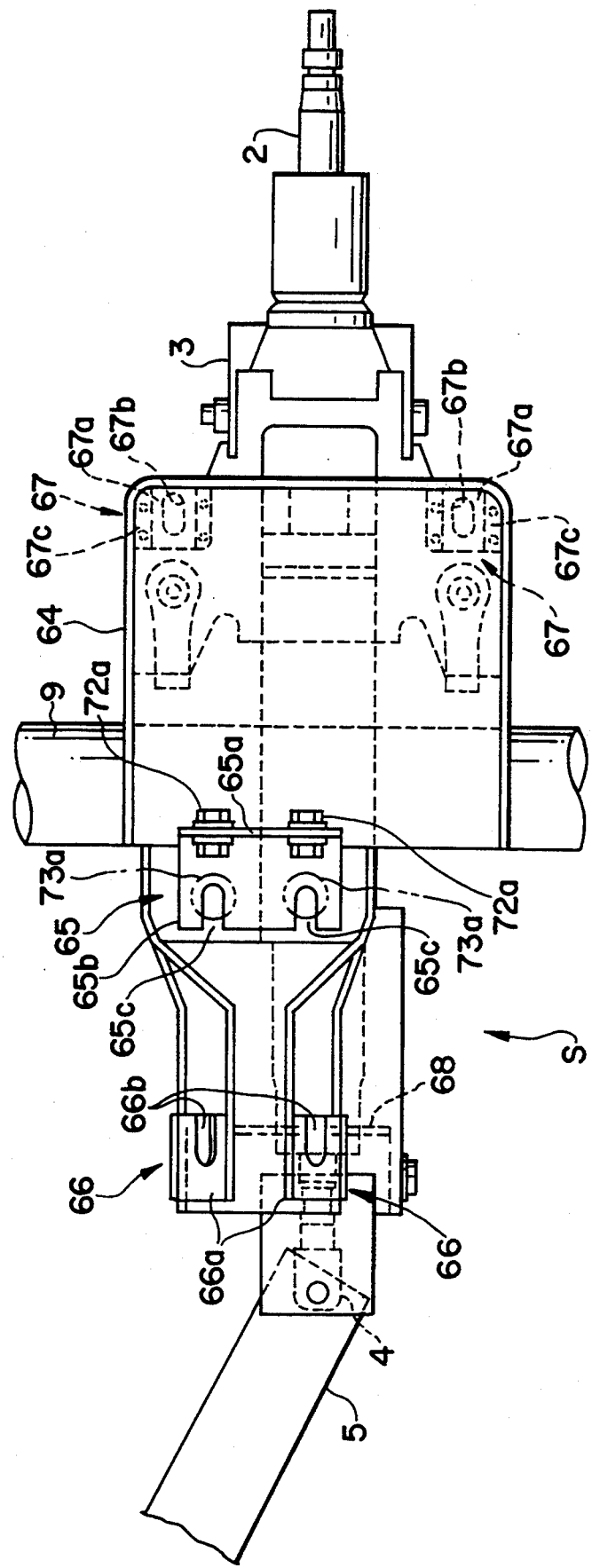
FIG. 6 is a plan view, partially in section, of the essential part of the steering shaft support structure of FIG. 4.

Referring to FIGS. 5 and 6 in conjunction with FIG. 4, the front section W of the vehicle body has a dashboard WD by which the vehicle body is separated into two compartments, namely an engine compartment WE and a passenger compartment WP. An instrument support member 10 for supporting an instrument panel (not shown) is attached to the dashboard WD from the back. These dashboard WD and instrument panel support member 10 are forced backward and deformed by devices, such as an engine and a powertrain located within the engine compartment WE when they are displaced backward in position due to a frontal end collision of the vehicle. In other words, the instrument panel support member 10, such as a cowl, is one of deformable or movable components of the vehicle body when the vehicle body suffers external impacts produced due, for instance, to frontal end collisions. The vehicle body is provided with a rigid steering support member 9, such as a steel pipe, located behind and in the close proximity to the instrument panel support member 10, which extends transversely between and is secured at its opposite ends to stationary and deformation free side components of the vehicle body (not shown), such as distal ends of left and right front pillars or left and right side frames. As was previously described, the deformation free component is a part of the vehicle body very relatively hard to be deformed by an external impact due to frontal end collisions. Further, a generally rectangularly box-shaped support bracket 64 is welded to, or otherwise fixedly supported by, the steering support member 9. As will be described in detail later, the support bracket 64 is connected to the instrument panel support member 10 by means of a generally L-shaped single rear link member 65 and a pair of generally U-shaped front link members 66 transversely separated, which compose a bracket link means. In addition, the support bracket 64 supports the steering column 3 by means of a single front link member 68 and a pair of rear link members 67 which compose a steering column link means. The front link member 68 is bolted by pairs of bolts and nuts 71, to the front end portion of a bottom wall 64a of the support bracket 64. Similarly, the rear link members 67 are bolted by pairs of bolts and nuts 70, or otherwise secured, to the rear end portion of the bottom wall 64a of the support bracket 64.

The rear link member 65 has a vertical wall portion 65a and a base wall portion 65b. The vertical front portion 65a of the rear link member 65 is bolted to the rear end wall 62a of the instrument panel support member 10 by a pair of fastening bolts 72a and nuts 72b sufficiently tightly to prevent the support bracket 64 from being disconnected from the instrument panel support member 10 even when the support bracket 64 or the rear link member 65 itself is subjected to a strong impact in the lengthwise direction of the vehicle body from the front to the back. On the other hand, the base wall portion 65b of the rear link member 65 is formed with a pair of slots 65c separated transversely, each of which extends in the lengthwise direction and opens toward the front of the vehicle body. The base wall portion 65b is bolted to the top wall 64b by means of a pair of fastening bolts 73a, passing through the slots 65c, respectively, and nuts 73b. In this instance, the fastening bolts 73a and nuts 73b are fastened rather insufficiently tightly so as to allow the rear link member 65 to slip out from the bolts 73a when the instrument panel support member 10 and/or the rear link member 65 is subjected to a strong impact in the lengthwise direction of the vehicle body from the front, thereby allowing the support bracket 64 to be separated from the instrument panel support member 10 due to the strong impact. On the other hand, each of the U-shaped front link members 66 has a bottom portion (not shown) welded, or otherwise secured, to the top wall 64b of the support bracket 64 and a top portion 66a formed a slot 66b extending in the lengthwise direction and opens toward the back of the vehicle body. The top portion 66b of the front link members 66 is bolted to the instrument panel support member 10 by means of a fastening bolt (not shown), passing through the slots 66b, and nuts (not shown). The fastening bolt and nut are fastened rather insufficiently tightly so as to allow the bolts and nuts to slip out from the slots 66b of the front link members 66 when the instrument panel support member 10 is subjected to a strong impact in the lengthwise direction of the vehicle body from the front, thereby allowing the instrument panel support member 10 to be separated from the support bracket 64 due to the strong impact. Accordingly, the bracket link means composed by the front and rear link members 65 and 66 allows the instrument panel support member 10 to be separated from the support bracket 64 when the instrument panel support member 10 is subjected to a strong impact due, for instance, to a frontal end collision.

The front link members 68, having a high structural rigidity, is, on one hand, welded, or otherwise secured, to the steering column 3 and, on the other hand, rigidly fixed by fastening bolts and nuts 71 to the bottom wall 64a of the support bracket 64. The connection between the front link member 68 and support bracket 64 is made sufficiently strong to be properly maintained even when the steering column 3 is subjected to strong impacts from the steering wheel or when the support bracket 64 is subjected to a strong impact from the instrument panel support member 10. Because of the strong connection of the front link member 68 to the support bracket 64, if, in the event of frontal end collisions of the vehicle W, the steering apparatus S is subjected directly at its forward portion around the gear box GB to strong impacts directed from the front to the back, it allows the first relay shaft 5 to break or bend easily and, thereby, prevent the steering shaft 2, and hence the steering wheel 1 from being displaced backward. In this sense, the support bracket 64 functions as a robust support member for the steering shaft 2. In other words, in the event of a frontal end collisions, enhanced support is provided by the robust support structure, with the first relay shaft 5, i.e. a front collapsible zone, designed to absorb the energy of an impact to the steering apparatus S before it reaches the driver through the steering wheel 1. Describing more specifically the robust support structure with reference to FIG. 4, if the energy of a strong impact is exerted on the gear box GB or parts around the gear box GB in the lengthwise direction $X_4$ during a frontal end collision of the vehicle W, the steering apparatus S is entirely shoved backward. First of all in this event, the first universal joint 4 and the first relay shaft 5 are pressed backward and hit the front link member 68. Because the front link member 58 has a high structural rigidity and is fixedly connected to the support bracket 64, it certainly prevents the first universal joint 4 and first relay shaft 5 from being further forced backward. As the first relay shaft 5 is made insufficiently strong so as to likely occur column buckling when it smashes the front link member 68 through the first universal joint 4, it is almost certainly broken or bent as shown by a double-dotted line in FIG. 4. Due to the breakage of the front link member 68, the energy of an impact exerted on the gear box GB during a frontal end collision is absorbed before it reaches the steering shaft 2. In this manner, the steering shaft 2 is certainly prevented from being forced backward in the event of a frontal end collision.

Each of the rear link members 67, which is integrally made of a plastic material, has a base portion 67a formed with a closed slot-like opening 67b and side flange portions 67c having a difference in level from the base portion 67a. The rear link member 67 is placed between the steering column 3 and support bracket 14 with the side flange portions 67c secured to the steering column 3 and the base portion 67a between the steering column 3 and support bracket 14 in the axial direction to the support bracket 64 by means of the fastening bolt 70 passing through the closed slot-like opening 67b. In this instance, the rear link member 67 is designed and adapted to be destroyed by the fastening bolt 70 so as to provide separation of the steering column 3 from the support bracket 64 when any one of the steering column 3 and support bracket 64 is subjected to a strong impact. Accordingly, in order to allow the rear link member 67 to be destroyed by the fastening bolt 70, the link member 67 is bolted insufficiently rigidly to the support bracket 64 so as to produce a relative displacement between the two. The steering column link means thus composed supports and links the steering column 3 on opposite sides of its overlapped portion 3c to the support bracket 64.

In the operation of the steering shaft support apparatus of the present invention, during a frontal end collision of the vehicle W, the dashboard WD is shoved backward following the backward displacement of the various devices, such as an engine and a powertrain, in the engine compartment WE in the lengthwise direction of $X_1$, forcing the instrument panel support member 10 backward and upward as shown by a line $X_2$ in FIG. 4. In this event, the bracket link means composed by the front and rear link members 65 and 66 disconnects the linkage between the instrument panel support member 10 and support bracket 64, so that even though the instrument panel support member 10 is further forced backward, the support bracket 64 stays without being displaced backward. Accordingly, both steering column 3 and steering wheel 1 are not displaced, being prevented from hitting the driver during the primary collision and certainly providing protection of the driver against getting a bruise. Then, following the primary collision, the driver is thrown out of the driver seat and suffers a secondary collision in which he or she almost certainly hits the steering wheel 1. In the event of a secondary collision, the driver exerts a relatively strong impact on the steering wheel 1, and hence the steering shaft 2 and steering column 3, in the lengthwise direction from the back to the front. Hitting of the steering wheel 1 causes breakage of the base portion 67a of the rear link member 67 so as to break the linkage of the steering column 3 from the support bracket 64. As a result, since the steering shaft 2 and steering column 3 are collapsed as shown by a double-dotted line in FIG. 4 as the driver further forces the steering wheel 1, the driver is prevented from suffering serious wound during the secondary collision.

During a primary collision, even if the separation is failed for the worst between the support bracket 64 and the instrument panel support member 10, the steering column 3, and hence the steering wheel 1, is stably held in position by the support bracket 64, so as to enable an air bag to operate as a supplemental restraint system effectively to the driver. In addition, in the event of a frontal end collision of the vehicle w in which a strong impact is exerted directly on the forward portion, for instance the gear box GB, of the steering apparatus S in the lengthwise direction at a level shown by a line $X_4$ (see FIG. 4), the first relay shaft 5 is certainly broken, so as to prevent the steering shaft 2, and hence the steering wheel 1, from being shoved. This also provides protection of the driver against being hit by the steering wheel 1.

Figure 7:
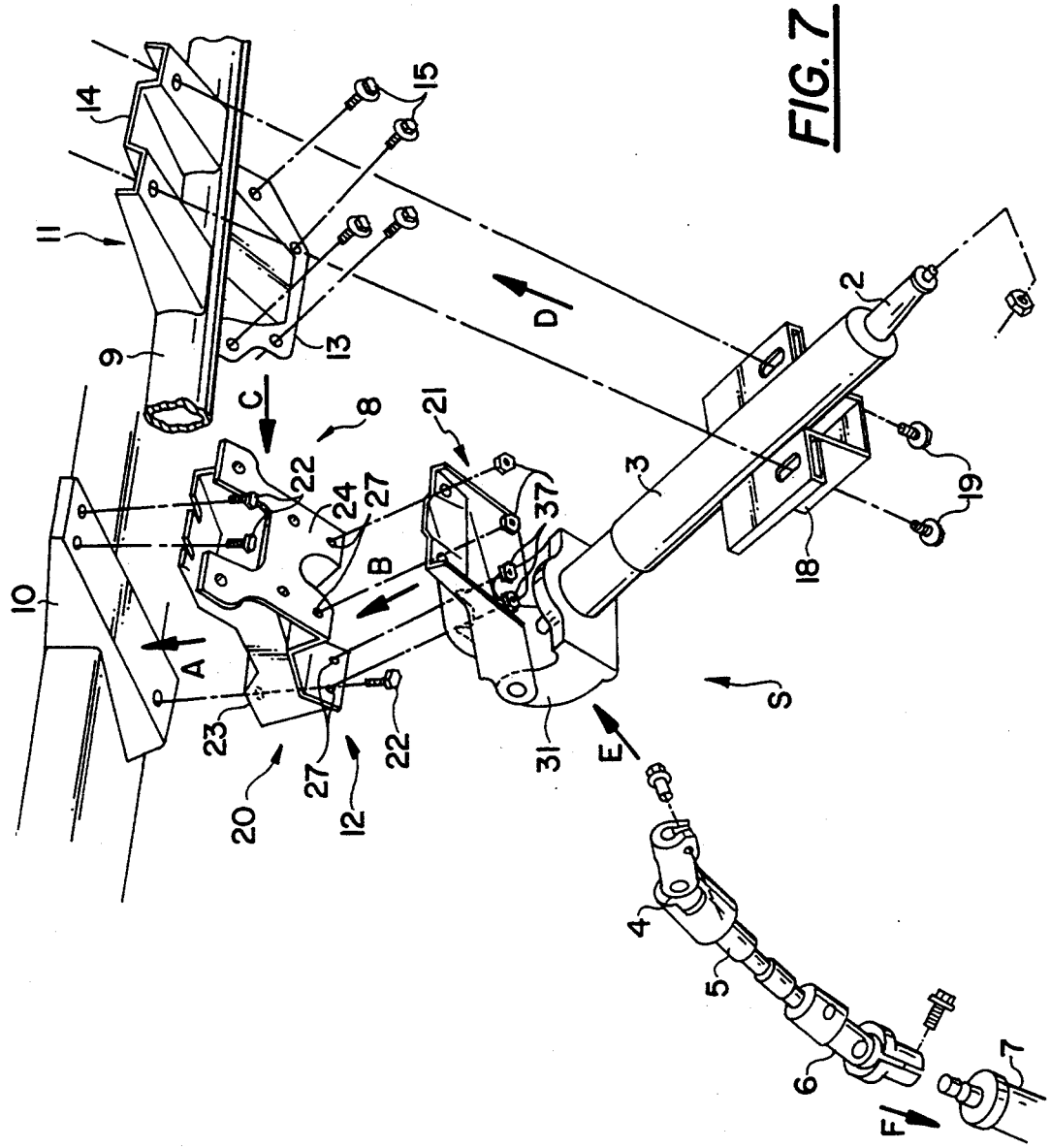
FIG. 7 is an exploded perspective view of a steering shaft support structure in accordance with another preferred embodiment of the present invention.
Figure 8:
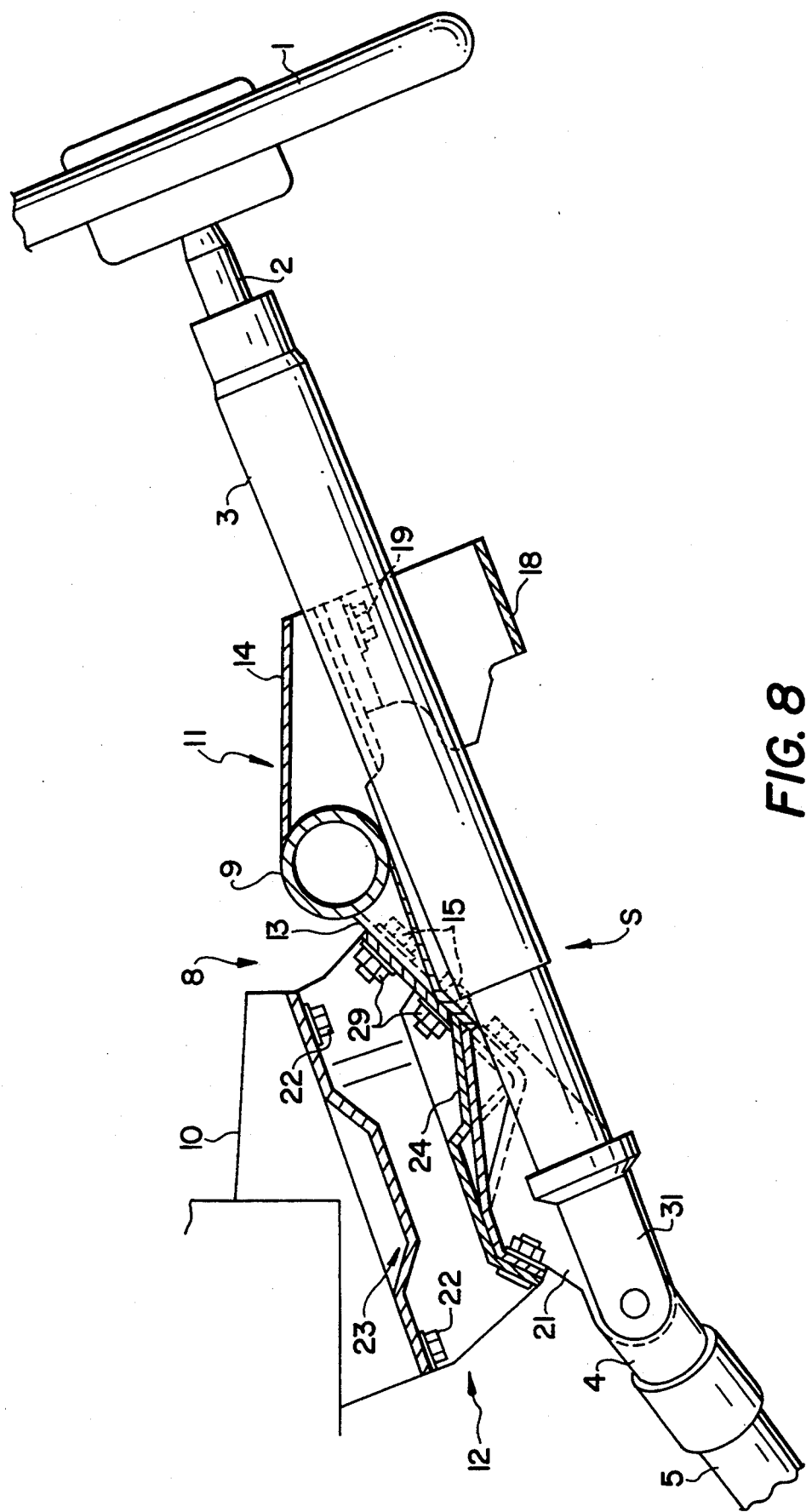
FIG. 8 is a longitudinal sectional view of an essential part of the steering shaft support structure of FIG. 7.

Referring to FIGS. 7 and 8 showing a steering shaft support structure according to another preferred embodiment of the present invention, a steering apparatus S is installed in the front section of a vehicle body (not shown). The steering apparatus S includes a steering shaft 2 with a steering wheel 1 coaxially attached to the rear end of the steering shaft 2 and a hollow steering column 3 coaxially receiving and rotatively holding the steering shaft 2 therein. Turn of the steering wheel 1 is transmitted from the steering shaft 2 to a first relay shaft 5 joined to the steering shaft 2 through a first universal joint 4, and a second relay shaft, i.e. a pinion shaft 7, joined to the first relay shaft 5 through a second universal joint 6, and then to a steering gear box 8. The steering gear box 8, which multiplies driver turning force and converts the rotation into linear motion, may be of any type well known to those skilled in the art. This steering gear box 8 causes linear movement of a tie rod connected to each of wheels by means of a steering knuckle assembly or unit (not shown). The wheels turn when the steering wheel is turned and causes the steering knuckle assemblies or units to swivel through the steering system S.

The steering column 3 is supported by a steering support member 9 and an instrument panel support member 10 through a support bracket means 8. The steering support member 9, made of, for instance, a rigid steel pipe, is located behind and in the close proximity to an instrument panel (not shown), and extends transversely between and secured at its opposite ends to stationary and deformation free side components of the vehicle body (not shown), such as distal ends of left and right front pillars or left and right side frames. The instrument panel support member 10, such as a cowl, is one of deformable or movable components of the vehicle body due directly or indirectly to external impacts produced during frontal end collisions of the vehicle body.

Figure 9:
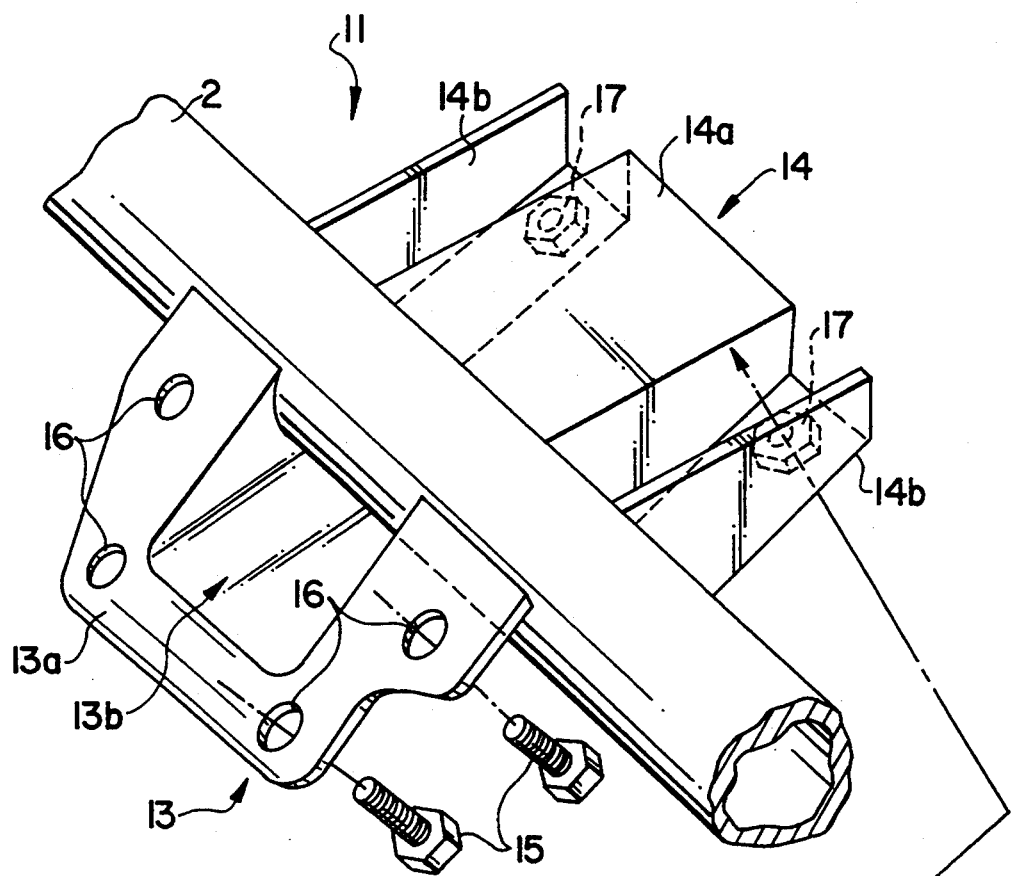
FIG. 9 is an enlarged, exploded perspective view of a rear support bracket assembly of the steering shaft support structure.
Figure 9:
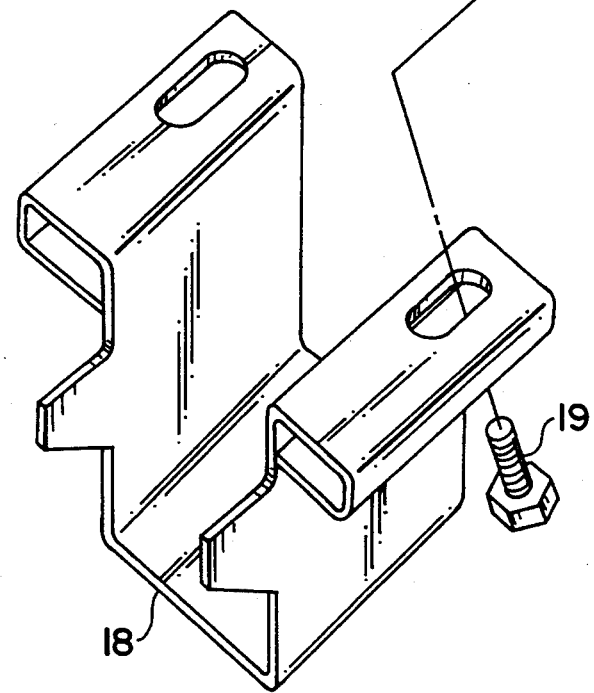

Referring to FIG. 9, the support bracket means 8 is composed by two components, namely front and rear support bracket assemblies 12 and 11, for supporting forward and rearward portions of the steering column 3, respectively. The steering column 3 is provided with a tilt mechanism and its adjusting mechanism (not shown) attached to where it is supported by the rear and front support bracket assemblies 11 and 12. The rear support bracket assembly 11 includes front and rear link members 13 and 14 welded, or otherwise secured, to the steering support member 9 from the front and back, respectively. The front link member 13 is shaped like a generally triangular box so as to form an interior space 13b surrounded with an integrally formed peripheral flange 13a formed with bolt holes 16. The rear link member 14 includes a rectangular top wall 14a and U-shaped side reinforcement flanges 14b provided along opposite sides of the top wall 14a which are integrally formed so as to provide U-shaped side ditches. The rear link member 13 is provided with a plurality of nuts 17 secured to the bottoms of the ditches. The rear support bracket assembly 11 further includes a U-shaped fitting member 18 bolted to the rear link member 14 by fastening blots 15 into the nuts 17 to hold the rearward portion of the steering column 3 along with the tilt mechanism.

Figure 10:
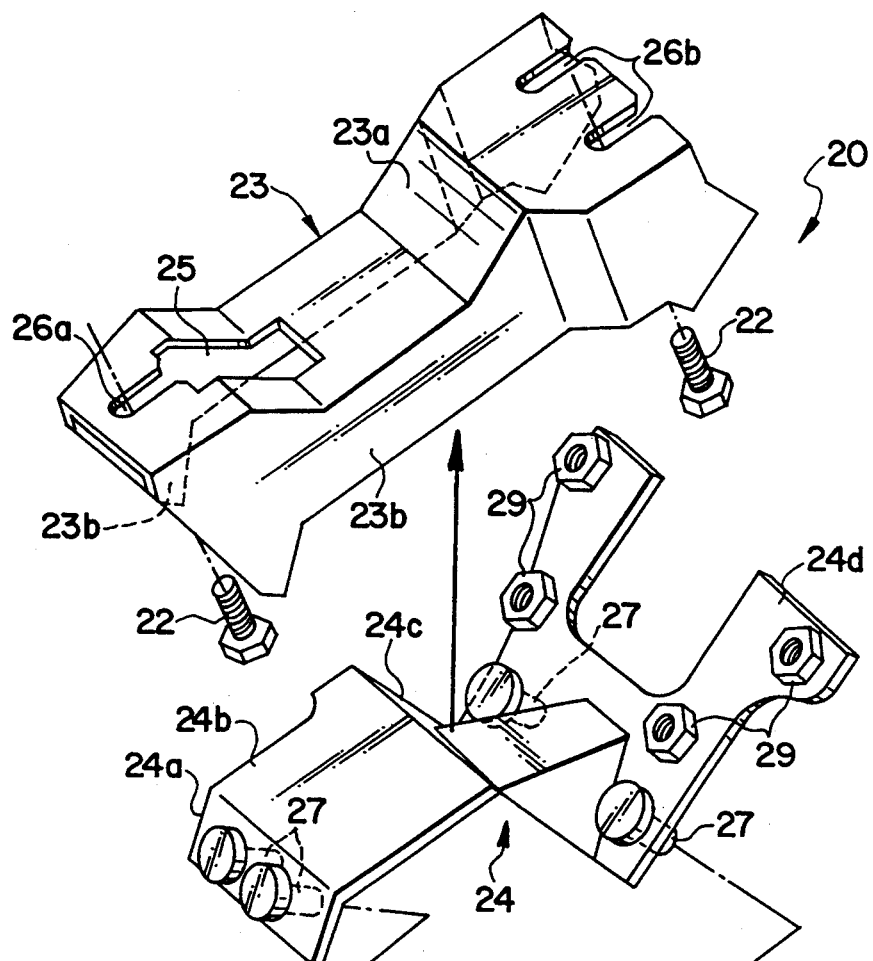
FIG. 10 is an enlarged, exploded perspective view of a front support bracket assembly of the steering shaft support structure.
Figure 10:
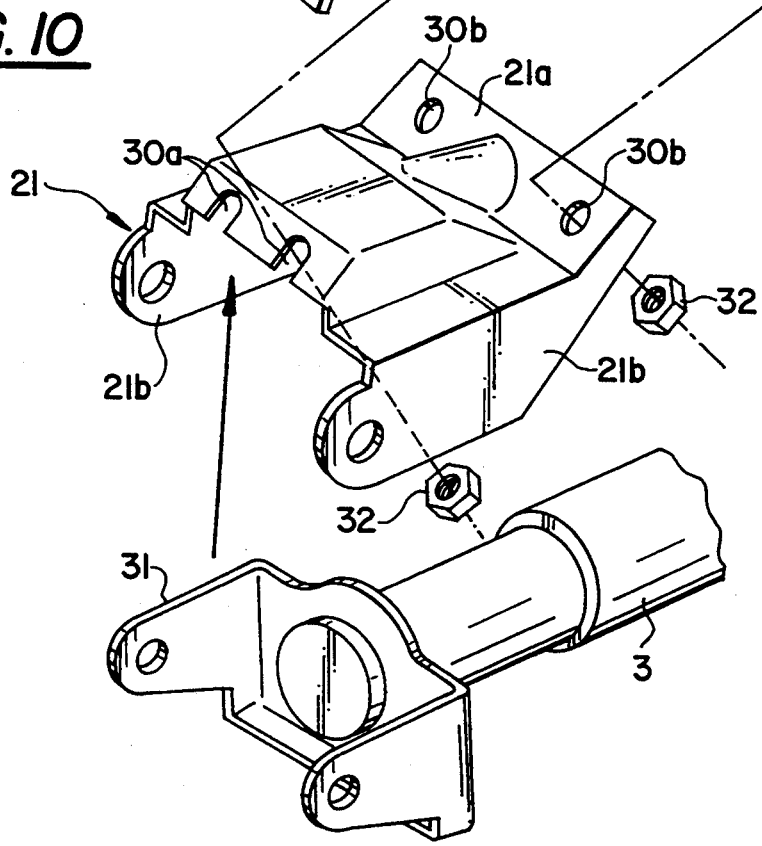

Referring to FIG. 10, the front support bracket assembly 12 includes a first link member 20 which is bolted, or otherwise secured, to the instrument panel support member 10 and a second link member 21 which is linked to the steering column 3 where it is held by the front support bracket assembly 12. The first link member 20 is shaped in a generally rectangular box having top and bottom plate members 23 and 24. The top plate member 23 is linked to the instrument panel support member 10 by link bolts 22, and the bottom plate member 24 is, on one hand, welded, or otherwise secured, at its front portion to the top plate member 23 and, on the other hand, bolted to the rear link member 13 of the rear support bracket assembly 11 by means of the fastening bolts 15. The top plate member 23 has a top wall 23a formed with a rectangular opening 25 and an elongated slot-like bolt hole 26a opening into the rectangular opening 25 in the close proximity to one end thereof and a pair of elongated open-ended bolt holes 26b in the close proximity to another end thereof which are transversely separated. The top plate member 23 further has left and right side walls 23b. The link bolts 22 are inserted through these slot-like bolt holes 26a and 26b and fastened so as to secure the top plate member 23 of the first link member 20 insufficiently rigidly to the instrument panel support member 10, thereby allowing the front support bracket assembly 12 to be disconnected from the instrument panel support member 10 in the event of a relative displacement between the instrument panel support member 10 and the front support bracket assembly 12. The bottom plate member 24 has a base wall 24b welded to the top wall 23a of the top plate member 23, a front wall 24a extending obliquely forward and downward from one end of the base wall 24b, a transitional wall 24c extending obliquely backward and downward from another end of the base wall 24b, and a generally U-shaped rear wall 24d extending obliquely backward and upward from one end of the transitional wall 24c. The bottom plate member 24 is provided with fastening bolts 27 extending downward from the front and rear walls 24a and 24d, and nuts 29 secured to the rear wall 24d. The second link member 21 has a generally V-shaped top wall 21a and side walls 21b extending downward from the top wall 21a at an approximately right angle. The top wall 21a is formed with a pair of open-ended slot-like bolt holes 30a along one end thereof and a pair of bolt holes 30b in the close proximity to another end thereof. The side walls 21b extend along and are pivoted to a forked pivotal support member 31 of the tilt mechanism. By means of this pivotal connection, the front support bracket assembly 12 links the steering column 3 to the instrument panel support member 10.

In assembling of various components of the steering apparatus to the vehicle body, sub-assembling of the support bracket means 8 is preparatorily made outside the vehicle body. Specifically, the rear support bracket assembly 11 is welded, or otherwise secured, to the steering support member 9. On the other hand, the front support bracket assembly 12 is rigidly fixed to the instrument panel support member 10, which is of relatively less structural rigidity, by bolting the first link member 20 to the same by the link bolts 22 as indicated by an arrow A in FIG. 1. Thereafter, as indicated by an arrow B, the steering column 3, which has previously been assembled to the tilt mechanism support member 31 welded thereto and the second link member 21 pivotally linked thereto, is placed inside the vehicle body. Then, the first and second link members 20 and 21 are fixed by means of engagement of the fastening bolts 27 extending from the first link member 20 with nuts 32, linking and assembling the forward portion of the steering column 3 to the instrument panel support member 10.

After pre-assembling of an instrument panel to the steering support member 9 and stay arms (not shown) to stay supports extending from a floor panel (not shown) in position, this pre-assembled steering support member 9 is brought into and placed in position inside the interior of the vehicle body. Then, the steering support member 9 is adjusted in its fitting position between and rigidly secured to the deformation free side components, such as the front pillars. Further, as indicated by an arrow C in FIG. 1, the rear link member 13 of the rear support bracket assembly 11, which has been rigidly secured to the steering support member 9, is connected to the bottom plate member 24 of the first link member 20 by means of engagement of the fastening bolts 15 with the nuts 29 secured to the rear wall 24d of the bottom plate member 24. Thus, the rear and front support bracket assemblies 11 and 12 are assembled together.

Subsequently, as indicated by an arrow D in FIG. 1, the U-shaped fitting member 18 is bolted to the rear support bracket assembly 11 by means of engagement of the fastening bolts 19 with the nuts 17 secured to the bottoms of the ditches formed in the U-shaped side reinforcement flanges 14b of the rear link member 14, fitting the steering column 3 to the steering support member 9 through the rear support bracket assembly 11. On the other hand, as indicated by arrows E and F, a relay shaft assembly including the first relay shaft 5 and the first and second universal joints 4 and 6 is interconnected between the steering shaft 2 and the second relay shaft 7. In the manner as described above, the steering apparatus S is supported by the support bracket means 8 composed by the front and rear support bracket assemblies 12 and 18 and thus assembled in the vehicle body. In this instance, the relay shaft assembly may be interconnected between the steering shaft 2 and second relay shaft 7 prior to the assembling of the steering apparatus S as indicated by arrows A through F in this alphabetical order.

With the steering support structure of the present invention, in the event of, for instance, a frontal end collision of the vehicle, the dashboard and the like separating an engine compartment and an passenger compartment are forced backward due to a large impact. Although this is likely accompanied by backward displacement of the steering shaft 2 and steering column 3, because the steering column 3 is supported from the front and back by the steering support member 9, which is structurally rigid and secured at its opposite ends to the stationary and deformation free side components of the vehicle body such as distal ends of left and right front pillars or left and right side frames, through the support bracket means 8, it is held unchanged in position and stably in posture. If in fact the instrument panel support member 10 is forced backward due to a large impact, the front support bracket assembly 12 allows the link bolts 22 fastened to the instrument panel support member 10 to slip out of the slot-like bolt holes 26a and 26b, so as to break the linkage between the instrument panel support member 10 and the front support bracket assembly 12. In other words, even if there is caused backward displacement of the instrument panel support member 10 due, for instance, to a frontal end collision, the steering column 3, and hence the steering shaft 2, is prevented from being forced backward by the instrument panel support member 10, so as to be still held unchanged in position by the support bracket means 8.

Because the steering support member is secured at its opposite ends to stationary rigid side components of the vehicle body which are likely free from deformation during frontal end collisions of said vehicle, and the steering column 3 is supported at its forward and rearward portions by the steering support member 9 through the support bracket device having the interconnected front and rear support bracket assemblies 12 and 11, the steering shaft support structure of this invention is simplified in structure and is enabled to support the steering apparatus stably. In other words, there does not occur changes in the angle of inclination of the steering shaft 2 and in the distance of the steering wheel 1 from the driver due to a frontal end collision, so that an air bag system, if installed as a supplemental restraining system in the steering wheel 1, and the collapsible steering assembly can function as intended. This prevent the driver from suffering a secondary collision.

As compared with a steering shaft support structure in which a steering column is supported by a single part of support bracket member, the support structure of this invention makes the support bracket device 8 easy to be manufactured and improves the efficiency of assembling in a small working space. In addition, because the support bracket device 8 is composed two support bracket assemblies, it is easy to change locally structural rigidity and/or supporting rigidity between the two. That is, it is advantageous to increase the rigidity of connection between the rear support assembly 11 and the steering support member 9 and make the front support assembly 12 lightweight. This is realized by changing the thickness of members. Even so changed, the support bracket device 8 is easy to be manufactured and improves the efficiency of assembling in a small working space.

Figure 11:
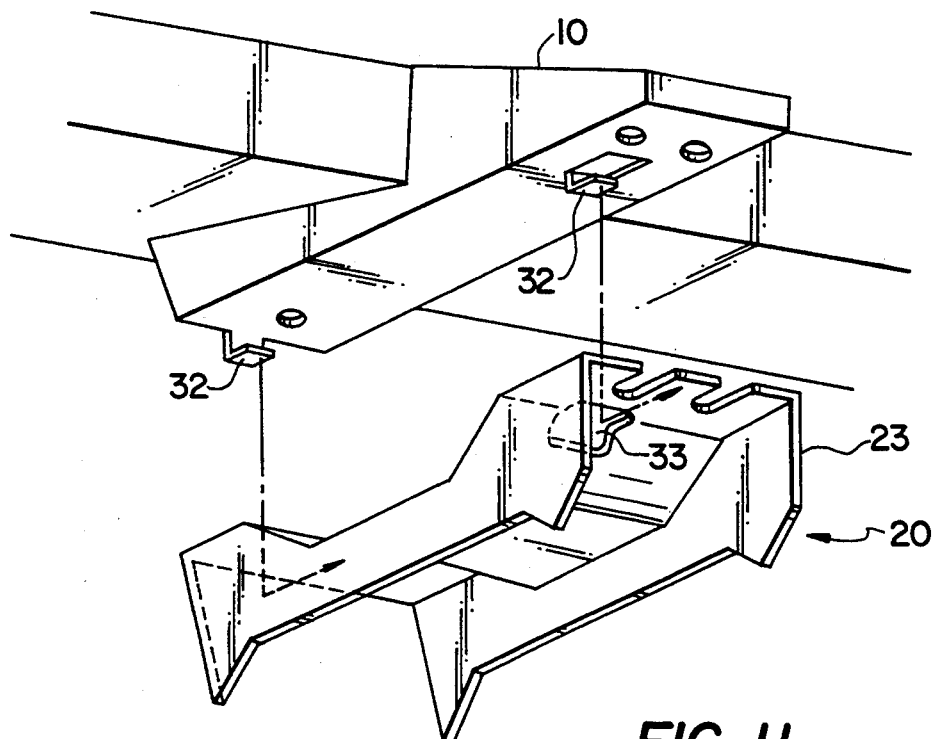
FIG. 11 is an enlarged, exploded perspective view of a variant of the front support bracket assembly of the steering shaft support structure.

Referring to FIG. 11, during assembling of the steering apparatus S into the vehicle body, provisional engagement may be made between the instrument panel support member 10 and the first link member 20 of front support bracket assembly 12. Specifically, the provisional engagement is realized through the engagement of a pair of L-shaped legs 32 separated in the lengthwise direction which are easily breakable with a lengthwise impact and formed integrally with or secured to the instrument panel support member 10. One of the legs 32 is engaged with the front edge of the top plate member 23 of first link member 20, and another leg 23 is engaged with the rear edge of an opening 33 formed in the top plate member 23 in the close proximity to the slot-like bolt holes 26b. The first link member 20 is provisionally engaged with the instrument panel support member 10 by bring the top plate member 23 in engagement with the legs 32 and then fixed by the link bolts 22 without being held in position with hands. Such a provisional engagement makes it quite easy to assemble the front support bracket assembly 12 to the instrument panel support member 10.

Figure 12:
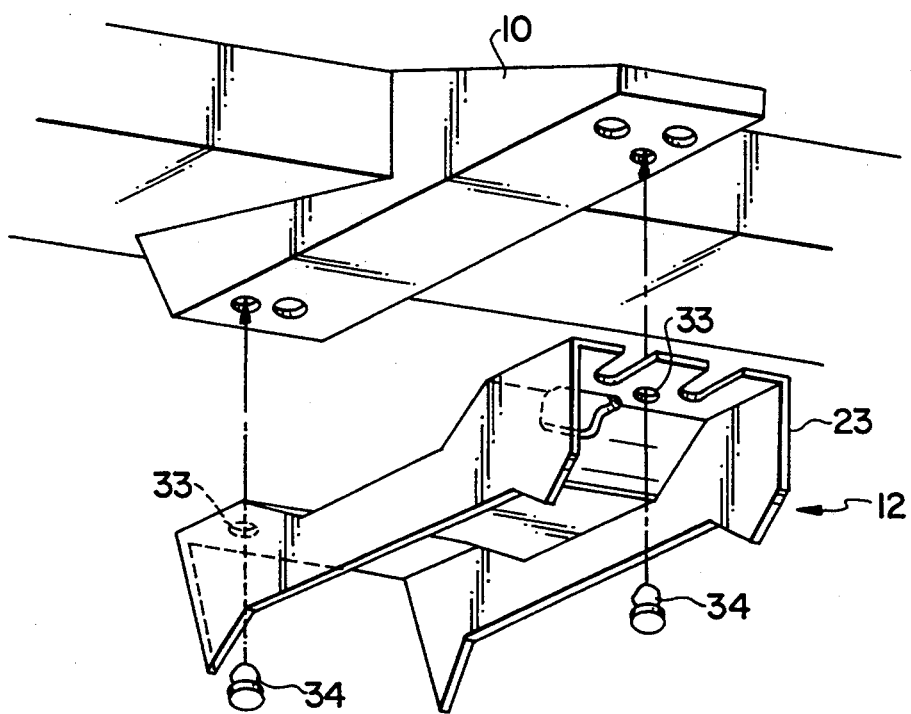
FIG. 12 is an enlarged, exploded perspective view of another variant of the front support bracket assembly of the steering shaft support structure.

Referring to FIG. 12, during assembling of the steering apparatus S to the vehicle body, provisional engagement may be made between the instrument panel support member 10 and the first link member 20 of the front support bracket assembly 12. Specifically, the provisional engagement is realized by means of the engagement of a pair of plastic resin set screws 34 separated in the lengthwise direction. Each of the set screw 34 is designed and adapted to be easily sheared due to relative displacement between the instrument panel support member 10 and the front support bracket assembly 12. These set screws 34 are engaged into instrument panel support member 10 through holes 33 formed in the top plate member 23 of the first link member 20. After the first link member 20 has been provisionally engaged with the instrument panel support member 10 by means of the engagement of the set screws 34 with the instrument panel support member 10, it is fixed by the link bolts 22 without being held in position with hands. Providing of such a provisional engagement makes it quite easy to assemble the front support bracket assembly 12 to the instrument panel support member 10. Further, when the instrument panel support member 10 is forced backward due to a large impact in the event of, for instance a frontal end collision and causes lengthwise displacement relative to the front support bracket assembly 12, the set screws 34 are easily sheared, allowing the link bolts 22 fastened to the instrument panel support member 10 to slip out of the slot-like bolt holes 26a and 26b of the top plate member 23 of the first link member 20. As a result, the front support bracket assembly 12 breaks the linkage with the instrument panel support member 10.

Figure 13:
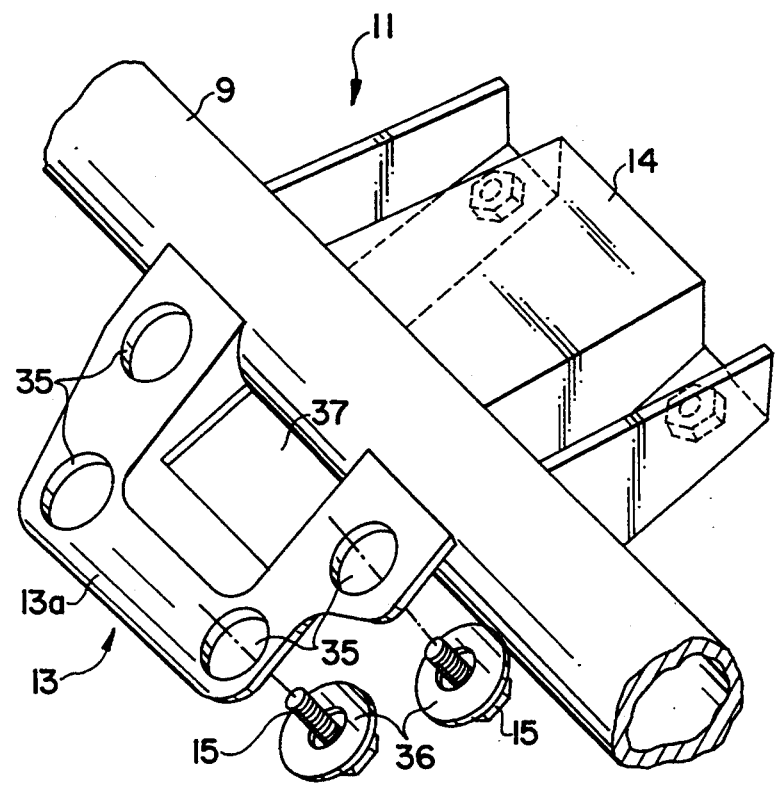
FIG. 13 is an enlarged, exploded perspective view of a variant of the rear support bracket assembly of the steering shaft support structure.

Referring to FIG. 13, the rear support bracket assembly 11 may be provided with a position adjusting means. The position adjusting means is composed by bolt holes 35 formed in the peripheral flange 13a of the rear link member 13 which have an internal diameter somewhat larger than the outer diameter of the fastening bolt 15 and the fastening bolts 15. The fastening blots are passed through the bolt holes 35 and fastened so as to secure the rear support bracket assembly 11 to the steering support member 9. Before securing rigidly the rear support bracket assembly 11, the rear support bracket assembly 11 is moved in all directions so as to be placed in its exact position within the clearance between the bolt hole 35 and fastening bolt 15. A washer 36 is placed between the peripheral flange 13a and the bolt head of the fastening bolt 15. It is of course that the relative lengthwise position between the front and rear support bracket assemblies 12 and 11 can be adjusted by adjusting the front support bracket assembly 12 by making use of displacement of the link bolts 22 within the slot-like bolt holes 26a and 26b. Further, the front link member 13 is formed with a rectangularly shaped opening 37 as to provide access to the link bolts 22.

Figure 1:
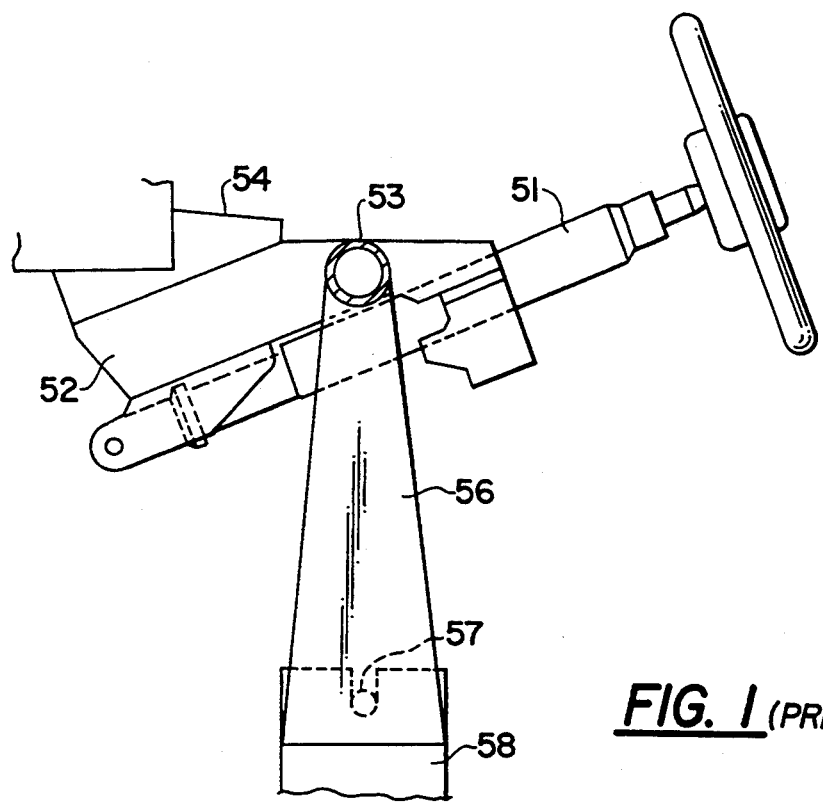
FIG. 1 is a schematic side view of a conventional steering shaft support structure.
Figure 2:
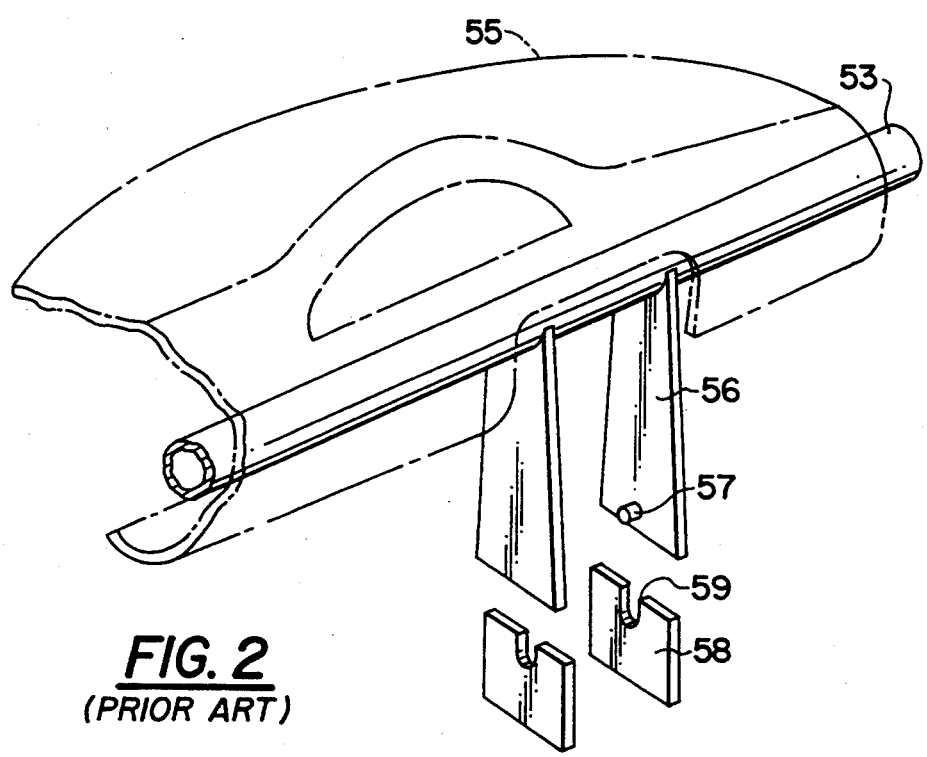
FIG. 2 is a perspective view showing a steering support member of the steering shaft support structure of FIG. 1.
Figure 3:
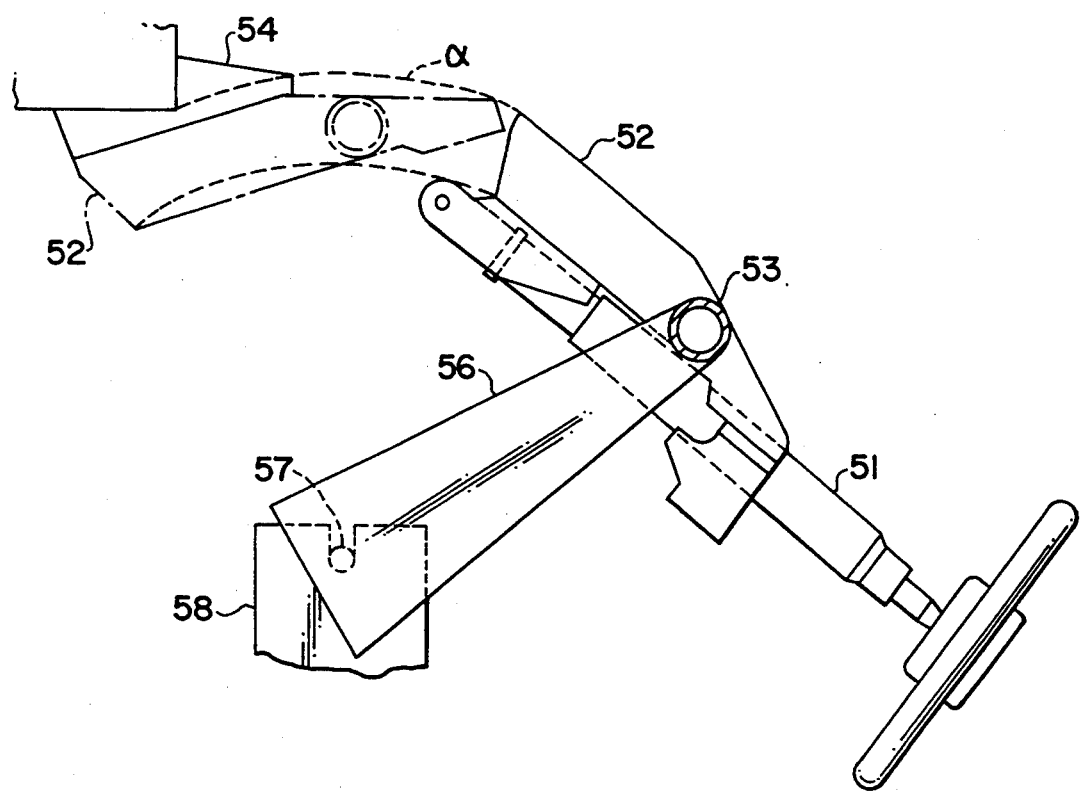
FIG. 3 is an explanatory illustration showing assembling of the steering shaft support structure of FIG. 1.

During interconnecting of the front and rear support bracket assemblies 12 and 11 by means of the fastening bolt 15 as indicated by the arrow C in FIG. 1 after having provisionally assembled the first link member 20 of the front support bracket assembly 12 to the instrument panel support member 10 by means of the link bolts 22, the lengthwise position of the front support bracket assembly 12 is adjusted relative to the rear support bracket assembly 11 by moving the front support bracket assembly 12 back and forth so as to displace the link bolts 22 within the slot-like bolt holes 26a and 26b. Before or after the adjustment of the lengthwise relative position between the front support bracket assembly 12 and the rear support bracket assembly 11, the rear support bracket assembly 11 is moved in all directions within the clearance between the bolt hole 35 and fastening bolt 15 and adjusted in position so as to place the steering column 3, and hence the steering shaft 2 and steering wheel 1 in their proper positions. Finally, the link bolts 22 are fastened to support the steering column 3 and steering shaft 2 in their exact positions.

Figure 14:
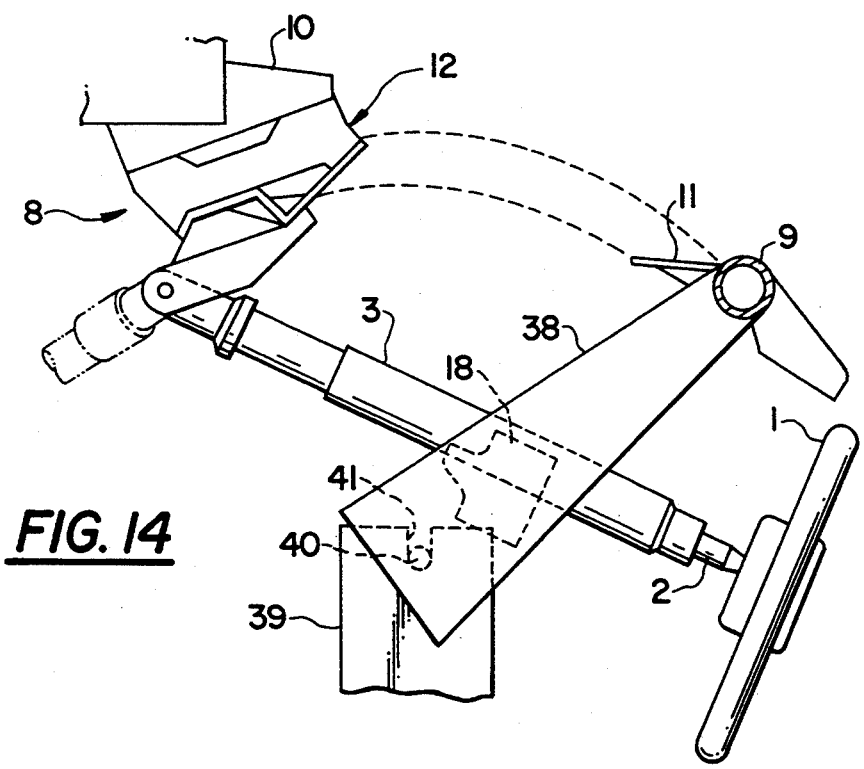
FIG. 14 is an explanatory illustration showing assembling of the steering shaft support structure of FIG. 7.

Furthermore, with the steering support structure, assembling is carried out in the steps of: rigidly fixing the front support bracket assembly 12 to the instrument panel support member 10 having a relatively less structural rigidity which is a stationary part of the vehicle body; introducing the steering support member 9 into the vehicle body and rigidly securing the steering support member 9 to the deformation free side components, such as the front pillars; interconnecting the rear and front support bracket assemblies 11 and 12 together; and linking the rearward portion of the steering column 3 to the rear support bracket assembly 11 of the support bracket means 8. Consequently, the steering support member 9 is assembled to the vehicle body without being accompanied by interference of the support bracket means 8 with the instrument panel support member 10, providing easy assembling works. In addition, with the steering support structure in which the front support bracket assembly 12 is composed by the first and second link members 20 and 21, after the first link member 20 has been previously secured to the instrument panel support member 10, it is interconnected to the second link member 21 linked to the steering column 3 so as to support the steering column 3 by the instrument panel support member 10. Consequently, linking operation of the steering column 3 with the front support bracket assembly 12 is performed without interference of the front support bracket assembly 12 with deformation free components of the vehicle body such as a steering support member 9, providing easy assembling works. Due to a small forward protrusion of the rear support bracket assembly 11 from the steering support member 9, if, during the placement of the steering support member 9 with the support bracket means 8 in position inside the vehicle body by means of turning of a pair of stay arms 38 extending downward from the steering support member 9 pivoted on a pair of counter stay arms 39 extending upward from the floor panel through the engagement between pivot pins 40 and slot-like openings 41 provided on each pair of the stay arms 38 and 39, the movement of the rear support bracket assembly 11 is made small as indicated by a dotted line $\beta$ in FIG. 14. This enables the assembling of the steering support member 9 with its associated parts into the vehicle body to be performed without interference of the components of support bracket means 8 with components of the vehicle body such as the instrument panel support member 10, providing easy assembling works.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A support structure for supporting a collapsible steering shaft assembly of a vehicle including a steering shaft with a steering wheel and a hollow steering column in which said steering shaft is rotatively received, said support structure comprising:

a steering support member extending transversely in a vehicle body and secured at its opposite ends to stationary side components of said vehicle body which are likely free from deformation during frontal end collisions of said vehicle;

a support bracket member secured to and supported by said steering support member;

a first link device for releasably linking said support bracket member to a part of said vehicle body which can be deformed backward during a frontal end collision of said vehicle and allowing said part of said vehicle body to be disconnected from said support bracket member during backward deformation of said part of said vehicle body; and a second link device for securing a forward portion of said steering column to said support bracket and releasably linking a rearward portion of said steering column with said support bracket, said second link device allowing said steering column to be disconnected from said support bracket and collapse when said steering wheel suffers an impact in a direction from the back to the front of said vehicle.

2. A support structure as defined in claim 1, wherein said collapsible steering shaft assembly is collapsible between said forward portion and said rearward portion.

3. A support structure as defined in claim 2, wherein said part of said vehicle body comprises a support member for supporting an instrument panel.

4. A support structure as defined in claim 3, wherein said first link device includes a disengageable inter-connecting mechanism disposed between said instrument panel support member and said support bracket member, said disengageable inter-connecting mechanism disengaging said instrument panel support member from said support bracket member during relative displacement in position between said instrument panel support member and said support bracket member.

5. A support structure as defined in claim 4, wherein said disengageable inter-connecting mechanism comprises a connecting member secured to either one of said instrument panel support member and said support bracket member, said connecting member being formed with an open-ended slot-like opening, and an engaging pin secured to another of said instrument panel support member and said support bracket member and placed for slide movement in said open-ended slot-like opening.

6. A support structure as defined in claim 4, wherein said disengageable inter-connecting mechanism comprises a pair of connecting members separately disposed in the longitudinal direction and formed with an open-ended slot-like openings opening in opposite longitudinal directions, one of which is secured to either one of said instrument panel support member and said support bracket member and another of which is secured to another one of said instrument panel support member and said support bracket member, and a pair of engaging pins secured to each of said instrument panel support member and said support bracket member and placed for slide movement in each said open-ended slot-like opening.

7. A support structure as defined in claim 2, wherein said second link device secures said forward portion of said steering column sufficiently rigidly to cause a relay rod connecting said steering shaft with a gear box to break during a frontal end collision of said vehicle.

8. A support structure as defined in claim 2, wherein said second link device includes a disengageable inter-connecting mechanism disposed between said support bracket member and said rearward portion of said steering column, said disengageable inter-connecting mechanism disengaging said steering column from said support bracket member during relative displacement in position between said support bracket member and said steering column.

9. A support structure as defined in claim 8, wherein said disengageable inter-connecting mechanism comprises a connecting member secured to either one of said support bracket member and said steering column, said connecting member being formed with an open-ended slot-like opening, and an engaging pin secured to another of said support bracket member and said steering column and placed for slide movement in said open-ended slot-like opening.

10. A support structure as defined in claim 8, wherein said second link device includes a disengageable inter-connecting mechanism disposed between said support bracket member and said rearward portion of said steering column, said disengageable inter-connecting mechanism comprising at least a shear pin for fixedly connecting said steering column and said support bracket member together, said shear pin being broken during relative displacement in position between said support bracket member and said steering column.

11. A support structure as defined in claim 10, wherein said shear pin is made of a plastic material.

12. A support structure for supporting a steering shaft assembly of a vehicle including a steering shaft and a hollow steering column in which said steering shaft is rotatively received, said support structure comprising:
a steering support member extending transversely in a vehicle body and secured at its opposite ends to stationary side components of said vehicle body which are likely free from deformation during frontal end collisions of said vehicle;
a support bracket device secured to and supported by said steering support member for supporting forward and rearward portions of said steering column; and
a link device for releasably linking said support bracket device to a part of said vehicle body which can be deformed backward during a frontal end collision of said vehicle and allowing said part of said vehicle body to be disconnected from said support bracket device during backward deformation of said part of said vehicle body.

13. A support structure as defined in claim 12, wherein said link device includes a disengageable inter-connecting mechanism disposed between said instrument panel support member and said support bracket device, said disengageable inter-connecting mechanism disengaging said instrument panel support member from said support bracket device during relative displacement in position between said instrument panel support member and said support bracket member.

14. A support structure as defined in claim 13, wherein said disengageable inter-connecting mechanism comprises a connecting member secured to either one of said instrument panel support member and said support bracket member, said connecting member being formed with an open-ended slot-like opening, and an engaging pin secured to another of said instrument panel support member and said support bracket member and placed for slide movement in said open-ended slot-like opening.

15. A support structure as defined in claim 12, wherein said support bracket device comprises a front support assembly for supporting said forward portion of said steering column, a rear support assembly for supporting said forward portion of said steering column, and an inter-connecting member for inter-connecting said front support assembly and said rear support assembly together.

16. A support structure as defined in claim 12, wherein said link device is secured to said inter-connecting member.

17. A support structure as defined in claim 12, wherein said front support assembly pivotally supports said forward portion of said steering column, and said rear support assembly supports said forward portion of said steering column so as to allow it to pivotally move.

18. A support structure as defined in claim 12, and further comprising an engaging member for provisionally engaging said link device to said part of said vehicle body, said engaging member disconnecting said instrument panel support member from said link device when relative displacement in position is caused between said instrument panel support member and said support bracket member.

19. A support structure as defined in claim 18, wherein said engaging member comprises at least a shear pin for fixing said link device to said part of said vehicle body, said engaging member being broken due to relative displacement in position between said instrument panel support member and said support bracket member so as to allow said link device to be disconnected from said part of said vehicle body.

20. A support structure as defined in claim 19, wherein said shear pin is made of a plastic material.

21. A method of assembling a steering apparatus including a hollow steering column and a steering shaft received in said steering column into a vehicle body, said steering apparatus being supported by a support structure which comprises a steering support member extending transversely in said vehicle body and secured at its opposite ends to stationary side components of said vehicle body which are likely free from deformation during frontal end collisions of said vehicle, a support bracket device, including forward and rear support assemblies for supporting forward and rearward portions of said steering column, respectively, secured to and supported by said steering support member, and a link device for releasably linking said support bracket device to a part of said vehicle body which can be deformed backward during a frontal end collision of said vehicle body and allowing said part of said vehicle body to be disconnected from said support bracket device during backward deformation of said part of said vehicle body, said method comprising the steps of:

provisionally securing said front support assembly to said forward portion of said steering column and attaching said rear support assembly to said steering support member;

connecting said link device to said part of said vehicle body;

introducing said steering apparatus into said vehicle body;

securing said front support assembly to said link device;

securing said steering support member to said stationary side components of said vehicle body;

inter-connecting said front support assembly and said rear support assembly together; and securing said rearward portion of said steering column to said rear support assembly.

22. A method as defined in claim 21, and further comprising previously attaching elongated stay arms to opposite ends of said steering support member and counter stay arms to a floor portion of said vehicle body at transversely opposite sides of said vehicle body, and pivotally engaging said elongated stay arms and said counter stay arms before securing said steering support member to said stationary side components of said vehicle body.

* * * * *